United States Patent
Fitch et al.

(10) Patent No.: US 6,647,389 B1
(45) Date of Patent: Nov. 11, 2003

(54) SEARCH ENGINE TO VERIFY STREAMING AUDIO SOURCES

(75) Inventors: Jonathan M. Fitch, Cupertino, CA (US); Carl C. Hewitt, San Jose, CA (US); John A. Bryant, Scotts Valley, CA (US); Eric C. Hewitt, San Jose, CA (US); Ben Robert Manuto, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 420 days.

(21) Appl. No.: 09/651,360

(22) Filed: Aug. 30, 2000

Related U.S. Application Data

(60) Provisional application No. 60/151,503, filed on Aug. 30, 1999.

(51) Int. Cl.[7] .............................................. G06F 17/30
(52) U.S. Cl. ...................... 707/10; 707/104.1; 709/201; 709/219; 709/229
(58) Field of Search ............................. 707/1–6, 9, 10, 707/100–104.1; 709/219, 249; 379/88.22; 370/230, 443

(56) References Cited

U.S. PATENT DOCUMENTS

| | | | |
|---|---|---|---|
| 5,793,966 A | | 8/1998 | Amstein et al. |
| 5,838,682 A | | 11/1998 | Dekelbaum et al. |
| 5,903,892 A | * | 5/1999 | Hoffert et al. ................ 707/10 |
| 5,961,601 A | | 10/1999 | Iyengar |
| 6,006,265 A | | 12/1999 | Rangan et al. |
| 6,012,068 A | * | 1/2000 | Boezeman et al. ...... 707/104.1 |
| 6,018,619 A | | 1/2000 | Allard et al. |
| 6,094,677 A | | 7/2000 | Capek et al. |
| 6,144,991 A | | 11/2000 | England |

* cited by examiner

*Primary Examiner*—Jean R. Homere
*Assistant Examiner*—Mohammad Ali

(57) ABSTRACT

An automated method for periodically evaluating media streams on a network of computers. The invention is used to determine the availability of various media streams and identify various characteristics of each stream. By repeatedly obtaining the addresses, attempting to establish communication with each media stream, and then reporting the results the system can verify that each media stream is accessible and report various characteristics of the stream.

12 Claims, 12 Drawing Sheets

820 — YOUR SEARCH RETURNED 2 MATCHES!

830 — SORT BY: SIGNAL STRENGTH  CITY  NAME  POPULARITY  FORMAT

840 —
WE FUNK: SPRING, TX                              FUNK  WEBSITE
STRENGTH ▮▮▮▮▮▮▯▯ | 64K STREAMING MP3 | SET ①②③④⑤ + | PLAY ▲
STRENGTH ▮▮▮▮▯▯▯▯ | 24K STREAMING MP3 | SET ①②③④⑤ + | BUSY
100% UNCUT FUNK. QUALITY HIP-HOP. RARE GROOVES. OLD SCHOOL. PROFESSOR GROOVE JOINS TRUE AND DEEP FUNK. HE'S GOT OVER A HALF-DOZEN "WE FUNK" SHOWS.  MORE INFO

850 —
GROOVE JUICER: COLLEGE STATION, TX               FUNK  WEBSITE
STRENGTH ▮▮▮▮▮▮▯▯ | 64K STREAMING MP3 | SET ①②③④⑤ + | PLAY ▲
STRENGTH ▮▮▮▮▯▯▯▯ | 24K STREAMING MP3 | SET ①②③④⑤ + | DOWN
THE GROOVE JUICER IS AN OPEN, COLLABORATIVE EFFORT DEVOTED TO THE PROPAGATION OF FUNK MUSIC AND CULTURE.  MORE INFO

MORE INFO: RADIO AUSTRIA INTERNATIONAL

910 — STRENGTH ■■■□□□ | 32K REAL 3.0 | SET PRESET ①②③④⑤+ | PLAY ▲

920 — STRENGTH ■□□□□□ | 20K REAL G2 | SET PRESET ①②③④⑤+ | BUSY

930 —
CATEGORY: NEWS
SUBCATEGORY: INTERNATIONAL
CITY: VIENNA, AUSTRIA
LANGUAGE: GERMAN
HOMEPAGE: HTTP://WWW.ORF.AT/ROI/
COMMENTS: DAILY ENGLISH LANGUAGE PROGRAMS REPORT ON HAPPENINGS IN AUSTRIA, INCLUDING NEWS BULLETINS, INTERVIEWS, FEATURES, POLITICS, BUSINESS, CUTURE AND SPORTS.

SEARCH ENGINE TO VERIFY STREAMING AUDIO SOURCES

CROSS-REFERENCE TO RELATED APPLICATIONS

This application claims the benefit of U.S. Provisional Application No. 60/151,503, entitled "Search Verify Engine to Verify Streaming Audio Sources," filed on Aug. 30, 1999, the subject matter of which is incorporated herein by reference.

BACKGROUND OF THE INVENTION

1. Field of the Invention

The invention relates generally to accessing media content over a network and more specifically to the classification and monitoring of media content.

2. Description of Related Art

The Internet allows digital communication between a server computer and a client computer using various protocols, such as: protocols for the World Wide Web (WWW or Web), such as HTTP (Hyper-Text Transport Protocol), HTML (Hypertext Markup Language) or XML (eXtended Markup Language); protocols for media streams for playing audio or video content, such as MP3 (Motion Picture experts group, audio layer 3) and RM (Real Media); and protocols for wireless applications such as Wireless Application Protocol (WAP).

The WWW often serves as the user front-end for various non-WWW protocols (e.g., media streams and WAP), which are technically Internet services that are not part of the Web. For example, Web pages include text, graphics and access to streaming media resources, such as audio or video content. The user accesses the various content types by means of a browser or a media player, which may be a browser plug-in or a stand-alone application.

A unique Uniform Resource Locator (URL) identifies each computer resource on the Internet. To establish a connection with a particular resource on an Internet server, a user at a client computer sends a request to the URL associated with the desired Internet resource. User URL requests are usually made by typing the URL address directly into an address request box or by selecting a hypertext "hot link" referencing that URL. When the desired connection is formed between the Internet server and the client computer, the user is capable of interacting with the contents of that Internet resource.

Audio and video have been commonly accessible from Web pages since the introduction of media players such as RealPlayer® from RealNetworks® of Seattle, Wash., or Windows® Media Player from Microsoft® of Redmond, Wash., and other similar products. Such media content is usually played using a process called media streaming. Media streaming is a technique for transferring data from a server to a client across a network such that the data is processed and played as a steady and continuous stream. On-demand media streams, such as individual music works, news broadcasts, or program archives, have a fixed playing duration. Live media streams, such as simulcasts of broadcast programming or continuous entertainment services, usually have an unlimited length.

Users generally want to connect with high quality resources that provide the type of entertainment or service of their preference. However, conventional streaming media sources suffer from a variety of deficiencies. If the data cannot be transmitted fast enough between the server and the client due to network delays or user congestion, then short interruptions or garbled fidelity are experienced while the player catches up with the missed content. Furthermore, there is usually an upper limit to the number of simultaneous users that the media site can support, so new users may be denied service if they try to access the URL of the media component. Finally, some media streams may be out of service for a variety of other reasons, including technical problems, content carried on an associated broadcast station but specifically "blacked out" from Web streaming by the rights owner, human error, or a decision to no longer provide the Web services.

There are many different Web sites that provide a directory of audio, video or TV resources. Most of these directories are updated only occasionally, so that the directory listings are often substantially out of date due to the rapid pace of change experienced by media stream sites. There are thousands of media servers on the Internet, and users would like to keep up to date with the many highly dynamic changes affecting reception quality, availability, content, and broadcast schedule.

SUMMARY OF THE INVENTION

The invention is an automated method and a computer program for periodically evaluating media streams on a network of computers. The method and program determine the availability of various media streams and identify various characteristics of each stream. One embodiment of the method includes the steps of periodically obtaining a first and second group of addresses, attempting to establish communication with each media stream, terminating the connection if the connection was established, and reporting the results. Each address identifies a location of a media stream on the network. The second group of addresses only includes those media streams that were previously identified as being unavailable. The step of attempting to establish communication with each media stream is done to determine a characteristic of the media stream. However, even if communication is not established, that fact alone is valuable information that should be reported. A preferred embodiment of the invention periodically obtains the second group of addresses more frequently than the first group so unavailable media streams are verified more frequently than all other media streams.

Another embodiment of the invention includes the steps of periodically obtaining addresses, attempting to establish connections with the media streams using the addresses, determining the transmission rate of each media stream, and updating records that contain information about the media stream with information concerning whether a connection was made to each media stream and, if a connection was made, reporting the transmission rate.

In another aspect of the invention, a computer program includes a control loop and at least one stream verification routine. The control loop obtains a block of addresses from a database each time verification is required. The stream verification routine first receives an individual address from the control loop, then verifies that the media stream is capable of being accessed, and then delivers the results back to the database. Several different stream verification routines can be used if the available hardware can support simultaneous connections with the media streams.

BRIEF DESCRIPTION OF THE DRAWINGS

FIG. 8 is an illustration of an interactive display that provides interactive results produced from a Stream Database search.

FIG. 9 is an illustration of an interactive display that provides additional stream details provided from the Stream Database.

DETAILED DESCRIPTION OF THE PREFERRED EMBODIMENT

Figure 1A:
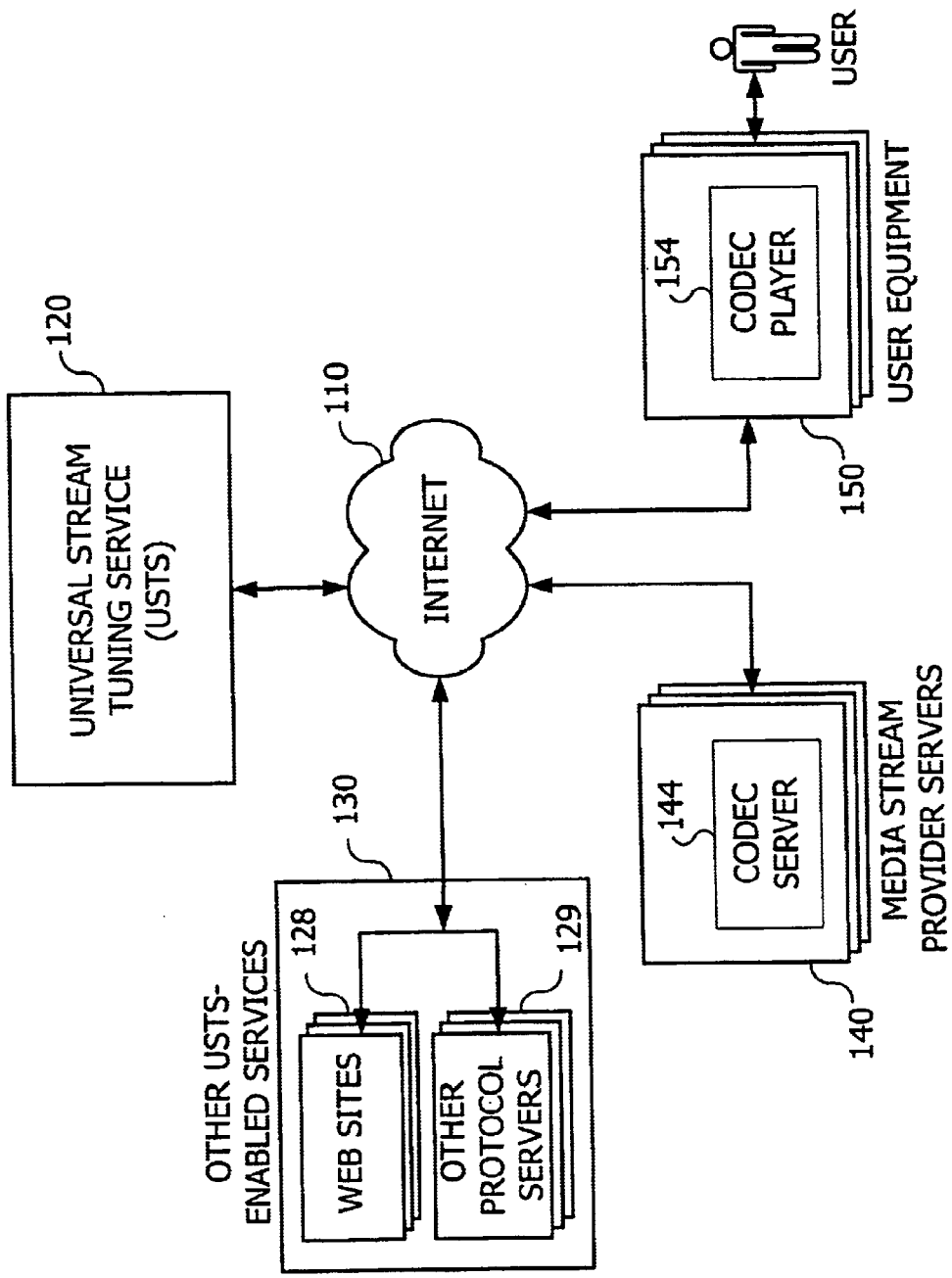
FIG. 1A is a block diagram illustration of the various systems associated with the invention.

FIG. 1A shows various systems that may communicate through the Internet 110. The Internet 110 is conventional and comprises a collection of networked computer nodes capable of exchanging data packets using standard transmission protocols. The Internet 110 is explained in the reference *LAN Times Encyclopedia of Networking*, Tom Sheldon, 1994. One such set of protocols conventionally referred to as media stream protocols, enables the transmission of various media streams between nodes throughout the Internet 110.

A Universal Stream Tuning Service (USTS) 120 enhances the ability of users to locate and receive media streams from the Internet.

The USTS 120 provides a very general tuning service designed to enable use of the USTS from a plurality of other USTS-enabled services 130, including Web sites 128 and other protocol servers 129, which may be provided by third parties. The design of the USTS allows the look, feel and content of the other USTS-enabled services 130 to be customized to the particular needs, formats, user equipment types, concepts and business model of each service provider.

The streams used with the USTS are sourced from media stream provider servers 140. Content supplied from media stream provider servers 140 may include:

Internet simulcasts of conventional radio and TV broadcasting programs;

On-demand streams, such as playing the latest news or weather on request, or playing selections from an entertainment library;

Netcasts, which can have similar programming formats to conventional broadcasting, but are carried only over the Internet;

Live events, such as concerts, sports, press conferences, conventions, etc.;

Premium services, which are subscription services to any type of media content;

Preferential logons, which are subscriptions to a priority server that provides access when public servers are busy; and Archives, which contain programs broadcast previously.

A codec (compression/decompression) server 144 may be provided in media stream provider servers. Codec servers provide streams that are compressed and coded for specific players such as RealPlayer® or Windows® Media Player, and other similar products.

The user equipment 150 contains at least one codec player 154, and may take many different forms: desktop computers with different operating systems (Windows®, Mac®, UNIX, Linux®, and other conventional operating systems); TV Web appliances, which use special computer-based equipment to display or play Web or Internet content over a TV set; Internet appliances, such as Internet radios and Web telephones; wireless laptop computers, or wireless Personal Digital Assistants (PDAs); wireless telephones; or game consoles with Internet capability.

Therefore, the USTS 120 assists users in finding and enjoying streams from a wide selection of media streams using a wide variety of stream reception equipment.

Figure 1B:
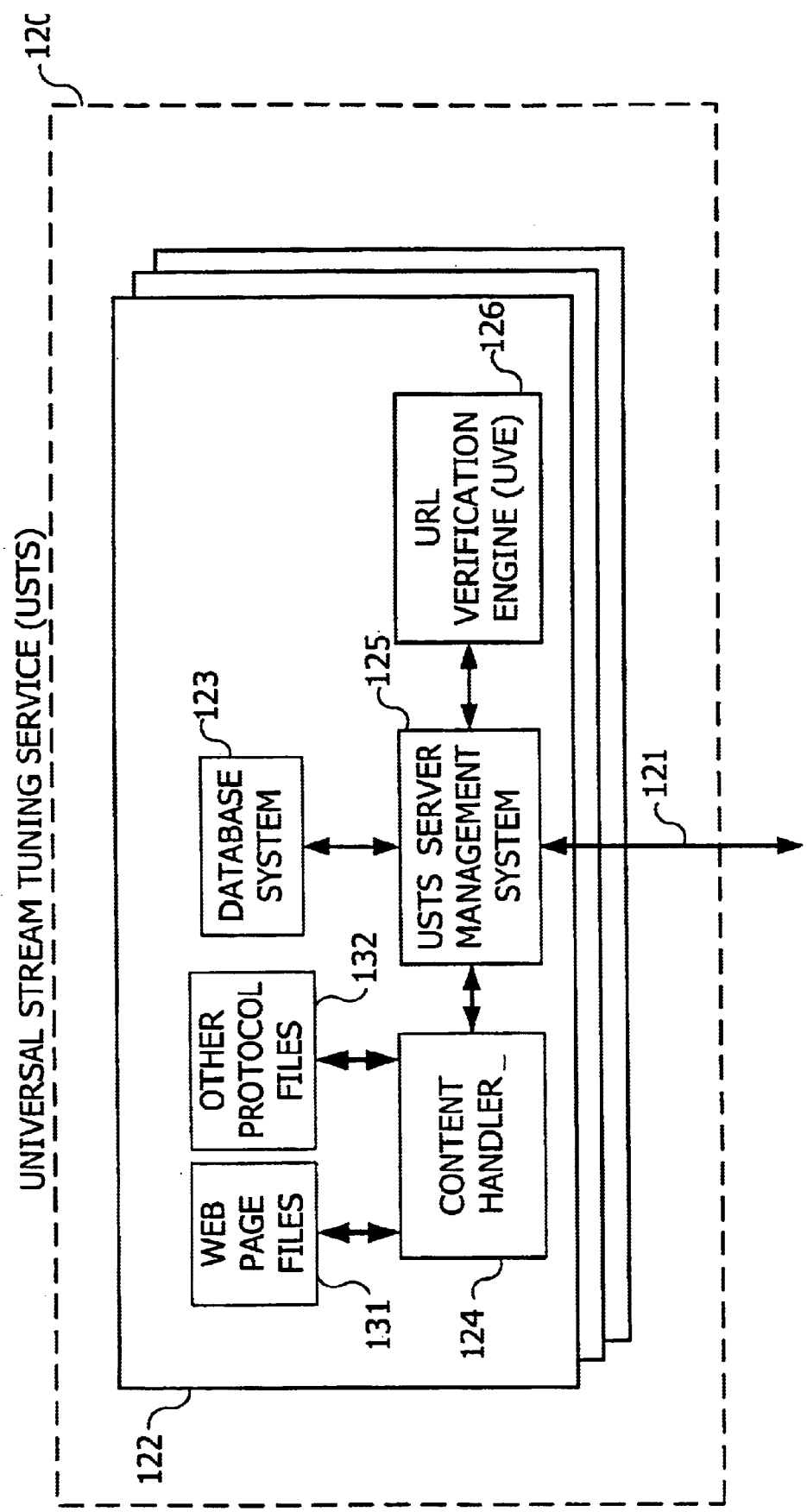
FIG. 1B is a block diagram illustration of the Universal Stream Tuning System (USTS).

FIG. 1B is a block diagram illustrating the Universal Tuning Service (USTS) 120, which comprises at least one Internet connection 121, and may have a plurality of USTS servers 122. The USTS server 122 may be comprised of a database system 123, a content handler 124, a USTS server management system 125, a URL Verification Engine (UVE) 126, Web page files 131, and other protocol files 132. The USTS servers 122 may be sited at the same location, or may be geographically distributed. The content handler 124 and the Web page files 131 may host direct Web pages for the USTS 120 or may host Web pages having USTS capabilities developed for or by third parties.

Figure 1C:
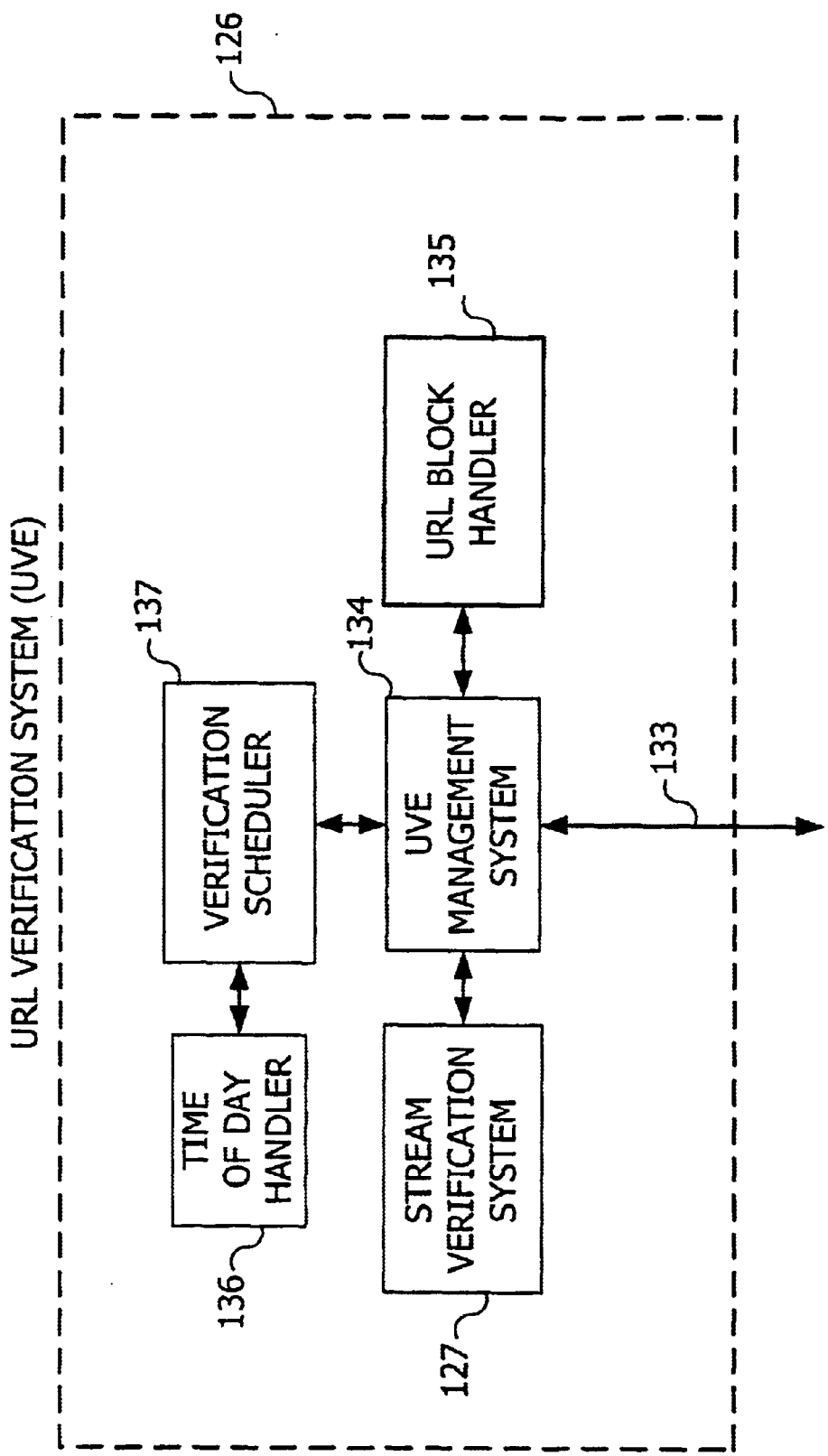
FIG. 1C is a block diagram illustration of the URL Verification Engine (UVE).

FIG. 1C is a block diagram illustrating the UVE 126, which comprises a stream verification system 127, a connection 133 to the USTS server manager system 125, a UVE management system 134, a URL block handler 135, a time-of-day handler 136, and a verification scheduler 137.

Figure 1D:
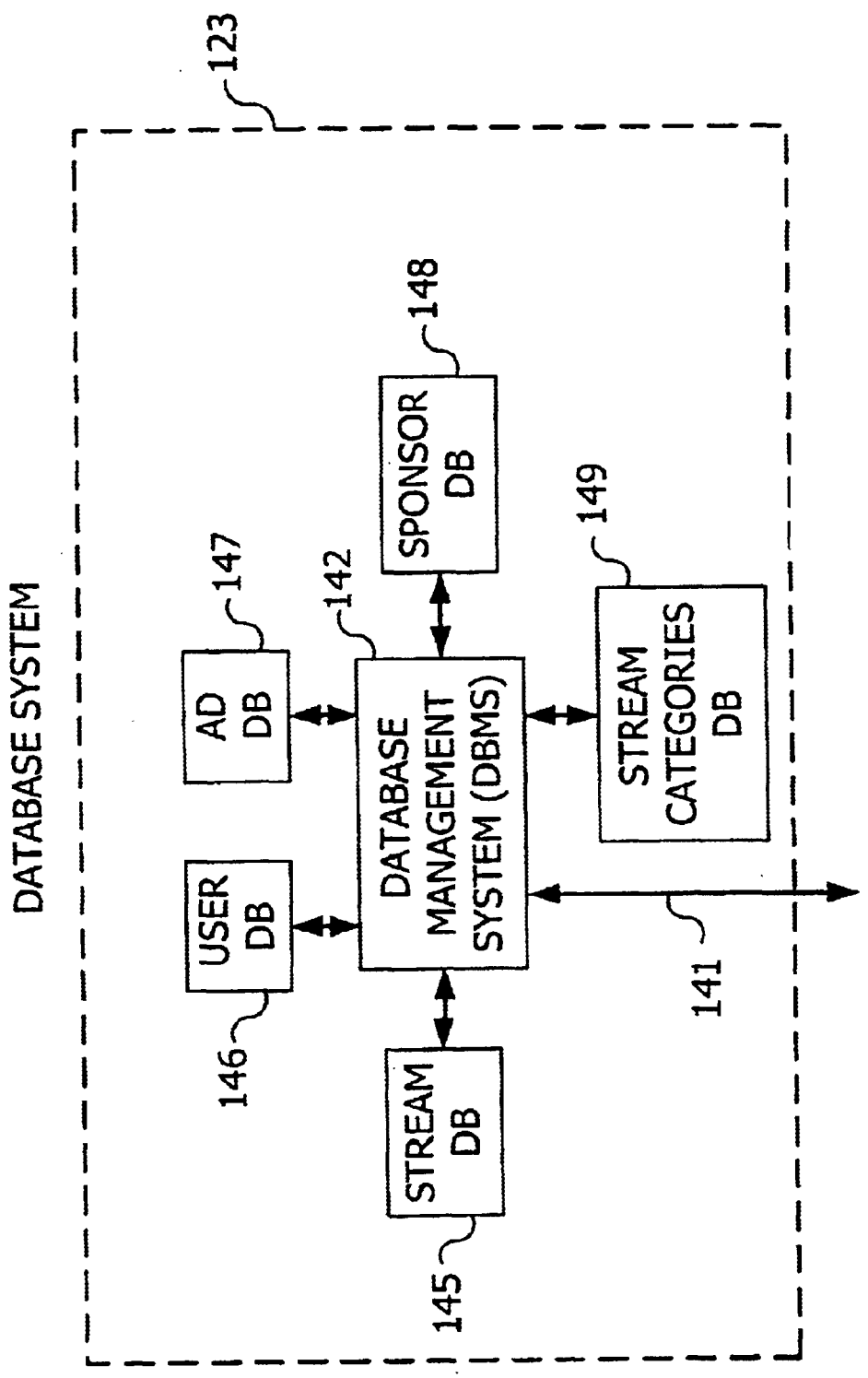
FIG. 1D is a block diagram illustration of the database system.

FIG. 1D is a block diagram illustrating the database system 123. Blocks referred to as a database may also be database subsets or tables. The database system 123. comprises a connection 141 to the USTS server management system 125, a database management system 142, a stream database 145, a user database 146, an advertisement database 147, a sponsor database 148 and a stream categories database 149.

Figure 2:
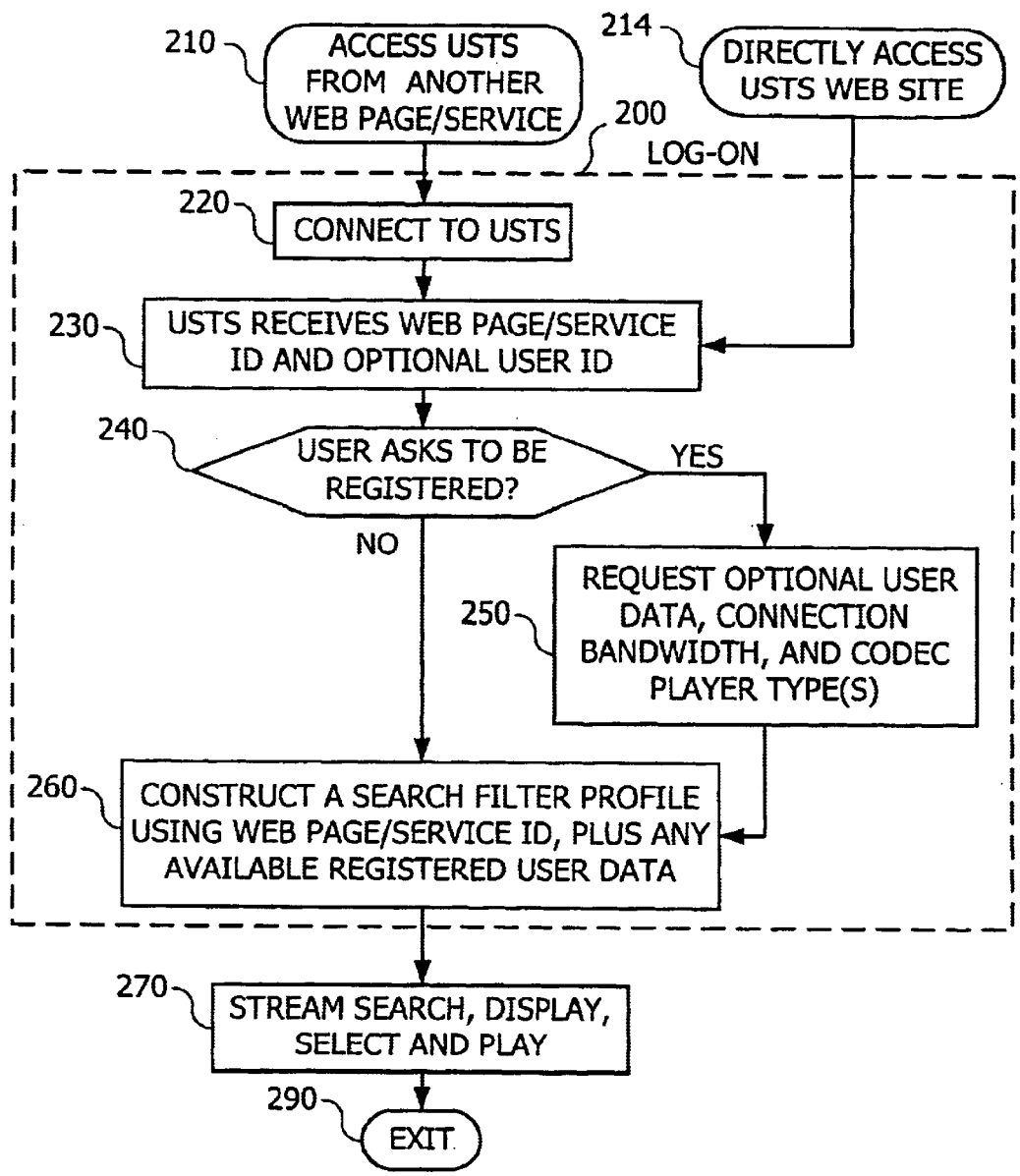
FIG. 2 is a flow chart illustrating a process for logging on to the USTS server.

FIG. 2 illustrates the log-on process to gain access to the USTS 120. A log-on step 200 enables a user of a USTS session hosted by the content handler 124, the Web page files 131, the other protocol files 132, or other USTS-enabled services 130 to interface with the USTS 120. One entry point 210 to the USTS 120 provides indirect access for other. USTS-enabled services 130, and the other entry point 214 provides direct access through the content handler 124, Web page files 131 or other protocol files 132. Users other USTS-enabled services 130 are connected to the USTS in a step 220, which may include authentication and recording the identity of that USTS-enabled services 130. The USTS 120 is provided with the identity of the internal or external services enabling access to the user in a step 230. If the the content handler 124, the Web page files 131, the other protocol files 132, or other USTS-enabled services 130 collect or forwards a user ID, that is also recorded by the USTS in the step 230.

The USTS 120 allows users to be anonymous. However, since there are advantages to being a registered user, the user is optionally permitted to register in step a 240. If the user wants to register, the USTS 120 requests user information and equipment information such as user name, address, e-mail address, Internet connection bandwidth and types of codec players 154 installed on the user's system 150 in a step 250. The USTS 120 creates a user search profile that is used to filter out media streams that do not apply to the user in a step 260. If the user is not registered, then the USTS 120 uses a search profile based only on the Web page or Internet service ID. Since the searches of non-registered users are not custom-filtered, search results of non-registered users may include many records that the user is unable to play. On the other hand, if the user is registered, then the USTS 120 creates a search filter profile based on the capabilities of user equipment 150, codec player(s) 154, and perhaps the individual user ID. Consequently, registered users get search results that are tailored to what the user is able to play.

Figure 3:
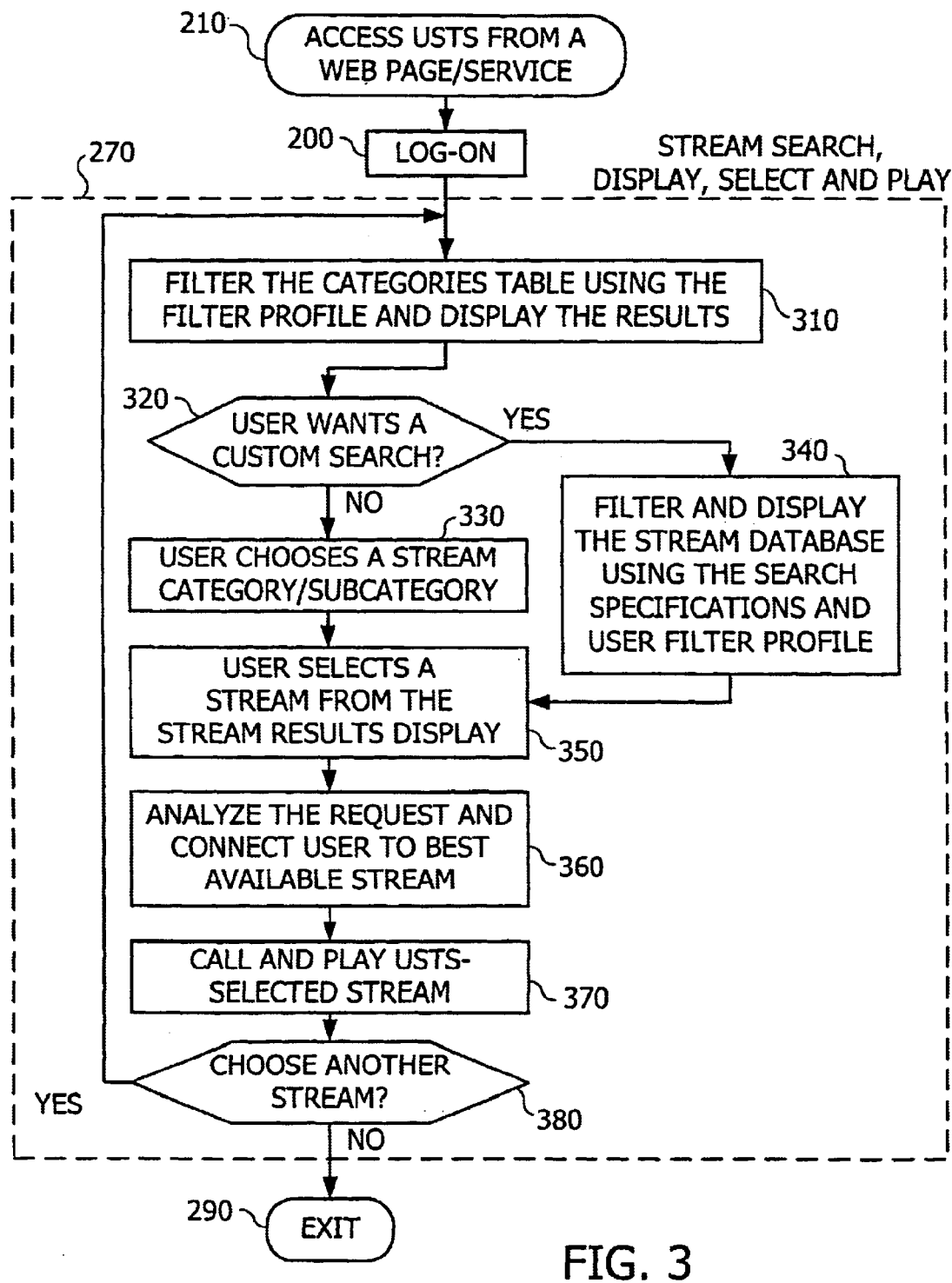
FIG. 3 is a flowchart illustrating a process for filtering, displaying, selecting, and playing media streams.

FIG. 3 shows the details of the stream search, display, select and play step 270. After log-on activities the USTS server 122 creates a stream categories table for the session from the stream categories database 149 through interaction with the database management system 142. The stream categories table may be tailored to meet the preferences of the other USTS-enabled services 130. All or a portion of the resulting session stream categories table may be displayed to the user in a step 310. The stream categories table may include only main categories or may be a hierarchical table listing all stream categories and subcategories. If subcategories are used, they may be displayed after selecting a category; or may be directly listed underneath each category.

The user selects a category or subcategory in a step 330 using any conventional interactive user control, such as any type of hypertext link, a user button, or an equipment function button, which records the selected category or subcategory. The USTS 120, through interactions that may involve the database management system 142, the stream database 145, and the user database 146, then performs a search for streams and displays the streams from the stream database 145 that match the category table description selected and the user filter profile.

The ability to perform a custom search may be provided by the USTS 120 in a tool bar interactive display or may be in a dialog box that the user accesses by standard means such as selecting a user button or a menu item. If this capability is provided, the user may use interactive text field or other interactive devices to describe the desired search. Although step 320, the option of performing a custom search, is shown after step 310 in FIG. 3, it may be used at any time prior to selecting a media stream in a step 350. The USTS 120 then locates and displays matching streams in the stream database 145 using the search specifications and user filter profile.

At step 350, the user interactively selects one media stream to play, either a category/subcategory stream choice from step 330 or a search results stream choice from step 340. The stream selection means may be any interactive user control which provides a link to a stream file, such as any type of hypertext link, a user button, or an equipment function button.

The same audio or video content may be available from a plurality of media streams, which may be identical streams, streams with a different codec format, or streams with a different bandwidth. Identical streams that are "mirrored" allow more users to access the content and the redundancy allows user to gain access to the material even if one stream is down. Mirrored streams in different geographical location additionally prevent regional outages from effecting users. Mirroring could be accomplished by the media provider, third parties, or stored on the USTS 120.

By uniquely identifying each individual item of media content in the stream database 145, users would request content and not individual media streams. The USTS 120 could then analyze the request and determine which media stream is the most appropriate for that particular user, based on geography, congestion, preferential log-on, and any other factors deemed appropriate. The USTS 120 could then redirect the URL to the appropriate media stream. Therefore, if the same request for media content were executed at different times or different locations, the user might be connected to different streams. By using this redirection, the user could bookmark media content and not be concerned with the details of which streams are available and always be redirected to the best media stream, have the best available same to be played.

In a step 370, the USTS 120 calls and plays the optimum URL determined in a step 360. Many players allow the user to pause or end the stream at any time by using player controls. In a step 380, the user can either loop back to step 310 to look for a new stream or exit from the USTS at a step 290. Once the connection to the third party media stream is made, the media stream may continue to play regardless of whether the user browses for a new stream or exits from the USTS 120 in step 290.

Figure 4:
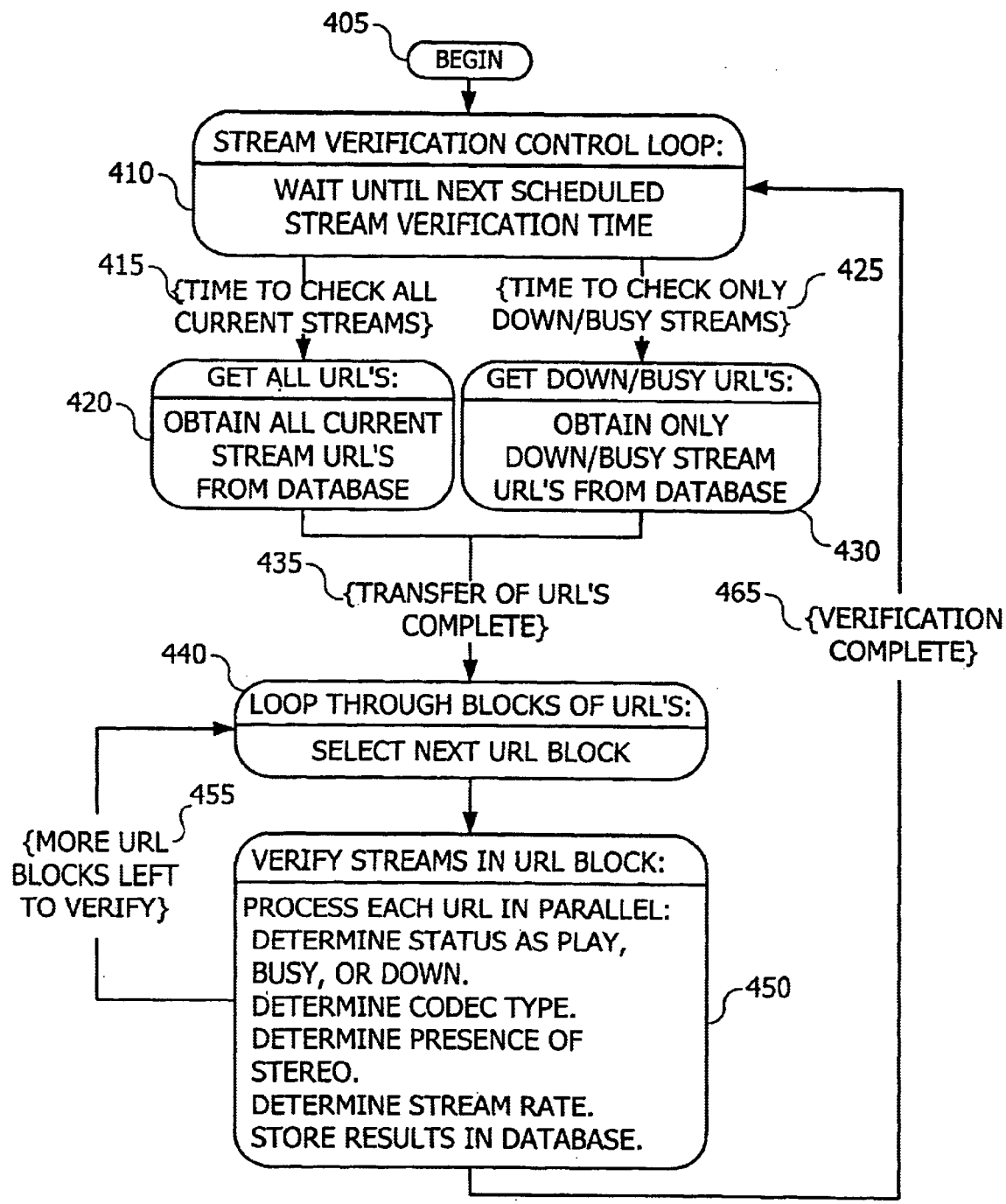
FIG. 4 illustrates a state diagram for the URL (Uniform Resource Locator) Verification Engine.

FIG. 4 shows a state diagram for the UVE 126 shown in FIG. 1C. States are shown in rounded boxes, and transition events are shown in text along the arrows between the states. After the stream verification system 127 begins running in a state 405, it automatically enters the top of a stream verification control loop 410, which waits until a scheduled verification time occurs. Preferably, there are at least two scheduled paths for verifying streams based on the stream characteristics and selected verification intervals.

Streams listed in the stream database system 145 may be categorized as having a status of play, busy or down. An event 415 occurs at the next scheduled time for checking all current streams. The verification scheduler 127 periodically requests blocks of active media stream URLs from the stream database 145, which may be managed by the UVE management system 134 and the URL block handler 135. Event 415 leads to a state 420, which obtains all current stream URLs from the stream database 145. An event 425 occurs at the next scheduled time for rechecking streams that were busy or down the last time that they were checked. Event 425 leads to a state 430, which obtains those stream URLs from the stream database 145 that were previously down or busy.

The verification check schedule in events 415 and 425 managed by the verification scheduler 137 involve performance tradeoffs. Verification checks need to be scheduled often enough that the stream data is reasonably current, but not so often that the verification process imposes an unnecessary load on the stream servers or make it impossible to complete checks all of the streams in the available time. Verification checking of all streams in event 415 is typically scheduled for about 60-minute intervals but checking intervals of between 15 minutes and 8 hours may also be used. Even if the resources allowed stream verification of greater than once every 15 minutes, it would not be desirable to check the streams so often that the UVE 126 puts an unreasonable load on the stream providers 140. Similarly, it is certainly possible to conduct stream verification at intervals greater than 8 hours, but that would probably result in at least some of the users being dissatisfied by finding stations whose actual status is incorrectly recorded in the database for much of the day. Checking of down or busy streams is a separate event 425 so that such inactive streams may be checked more frequently in order to quickly discover streams that have returned to play status.

An event 435 occurs upon completion of the complete URL transfer under the direction of the UVE block handler 135 from either state 420 or 430, and leads to state a 440, which incrementally loops block-by-block through the entire URL list. State 440 automatically passes to a state 450, which checks stream details of each URL in the URL block.

State 450 preferably uses a plurality of network connections, such as a plurality of active network sockets in the USTS server management system 125, so that a plurality of different URLs can be called and checked simultaneously. The first URL check performed by state 450 is to attempt connection to each stream. If the stream starts normally and a starting portion of the stream content has been read, the stream status is recorded in stream database 145 as play. If the stream server returns a "busy stream" message, the stream status is recorded as busy. If a connection cannot be made to the stream or reading the stream fails before the entire starting portion of the stream has been read, the stream status is recorded as down.

If the stream status is play, then various characteristics are obtained from the header, such as the specific codec type used to generate the stream, whether stereo is present, and the stream data rate. The starting portion is preferably about 1 Kilobyte, which is usually enough data to determine all of the various characteristics of the stream. All results are recorded in the corresponding dynamic fields of the stream table of the stream database 145.

The UVE 126, however, is not the only way to accomplish stream verification. An alternative method, which can be used to augment the UVE 126 or in place of the UVE 126, is to have the user equipment 150 report the status of media streams. Once the user has made a request for media content and obtained the appropriate stream URL, the user equipment 150 could be configured to analyze the stream and report the stream's characteristics back to the UVE 126. Although the usage patterns of users accessing media are not as predictable as the UVE 126, enough users have the potential of generating the same or better results than the UVE 126. However, in order to utilize this method, the USTS 120 must be able to exert some control over the user equipment 150. The user equipment 150 would need to be configured to report back to the USTS 120.

The database system 123 may be implemented with a relational database. Some database fields are essentially static and change only rarely, if at all. These fields represent information that was entered manually into the database system 123. Other database fields are subject to frequent changes, due to continual verification checks by the UVE 126. The remaining fields are changed only occasionally, such as user preferences, equipment or players supported.

In the field tables that follow, an asterisk (*) indicates fields that may be occasionally changed manually at the USTS 120, or by users or advertisers, and a double asterisk (**) indicates fields that may be changed frequently by the UVE 126 or the USTS server management system 125. Change to other field may originate with USTS personnel or the stream providers, who may notify the USTS 120 of the changes. Other changes may be discovered by USTS personnel or from reports of users. The timeliness of manually entering such changes in the database system 123 is limited by available staffing.

The stream characteristics records in stream database 145 may have fields such as:

Station Description Fields:
  Station ID
  Station Status (Play, Busy, Down)**
  Station Name (Call Letters or Name)
  Station Additional Description
  Station Frequency
  Station Geographical Location
  Main Language Used
  Station Service Type (Simulcast, Netcast, Archive, etc.)
  Flag Indicating Stream Access Provided through a Stream Distributor
  Station Broadcast Categories/Subcategories
  Station Key Words
  Station Info Web Page URL
  Date Station Info URL Last Verified/Checked**
  Number of Streams Carried**
Audio Stream Sub-tables (Multiple streams may be listed per station):
  Stream Format (Codec Type)**
  URL of Standard Web Page Associated with Stream*
  Stream Metafile* or **
  Stream Average and Maximum Bandwidth**
  Title/Author/Copyright**
  Stereo Flag**
  Live Flag**
  Recordable Flag**
  Stream Availability/Reliability**
  Stream Score**
  Stream Status (Play, Busy, Down)**
  Time Stream Last Checked/Validated**
  Number of Times Stream Played by Users**
  Stream Approved for Users Flag*
  Include in Current "Cool Streams"*

A stream metafile is a file containing the file names of a set of stream files. The stream metafile is accessed with the HTTP protocol, while the files it contains are accessed with stream protocols.

The stream score is calculated from other fields and may be either included as a database field, calculated by the USTS 120 software, or calculated by the other USTS-enabled services 130. The stream score is calculated as a weighted product of various stream parameters, which may include a stream bandwidth score, a codec format perceived-quality score and the measured availability of the streams. For example:

$$\text{Stream Score} = W_1 * \text{BandwidthScore} + W_2 * \text{CodecScore} + W_3 * \text{Availability},$$

where $W_1$, $W_2$ and $W_3$ are the relative weightings of the scoring criteria.

The BandwidthScore is approximately proportional to the stream bandwidth (either average or maximum, or a weighted combination of both). The CodecScore is a qualitative score based on user-perceived quality of streams using that type of Codec Server/Player combination. Availability is the fraction of the time that the stream is available to USTS users (i.e., in "play" status). The weighting factors or CodecScore values that are used will depend upon the particular business model, philosophy and operator judgement used in running the Web page management system 124 or other USTS-enabled services 130.

For example, in one implementation where bandwidth is considered very important, CodecScore is considered somewhat important and access is disregarded, the weights may be:

$W_1=0.7$ $W_2=0.3$ $W_3=0$

The corresponding ranges of weighted parameters used may be:

BandwidthScore range: between 0.5 and 10.0

CodecScore range: between 3.0 and 9.0

Availability range: not considered

Therefore, the range of the stream score in this illustration would be between (0.7×0.5+0.3*3.0)=1.25 and (0.7*10.0+ 0.3*9)=9.7. The stream scores may be rounded off downward to the nearest integer, to give an easily displayed range of between 1 and 9, such as by using a bar display for each stream having between one and nine bar segments.

The stream score can be used in a variety of graphical or text indicators that are embedded or otherwise included in the stream search results so that the user can anticipate how "good" stream reception will be.

The user database 146 allows certain fields to be registered with the USTS 120 or to be updated during a user session. The user database may have field such as:

User Fields:
 User ID
 User Status (active, inactive)
 Last and First Name
 User Address*
 User Telephone*
 Flag for Credit/Billing Problems*
 Payment Method (Credit Card, EFT)*
 User Stream Presets*
 User Favorites*
 Codec Player Formats Available on User Equipment*

The advertisement database 147 might contain data for advertisements, such as banner ads or streaming ads than can be inserted into the media content. The advertisement database 147 may contain fields such as:

Ad Fields:
 AD ID
 Ad Status*
 Ad Name
 Ad Sponsor
 Ad Description*
 Ad Type/Classification
 Ad Demographic targets*
 Ad Play Frequency*
 Ad Priority*
 Total Plays of Ad Requested*
 Ad Play Count**
 Count of User Responses to Ad**

The sponsor database 148 may be used in conjunction with the advertisment database 147. The sponsor database 148 contains all of the administrative contacts and billing information for the sponsors of the advertisements contained in advertisement database 147.

Figure 5:
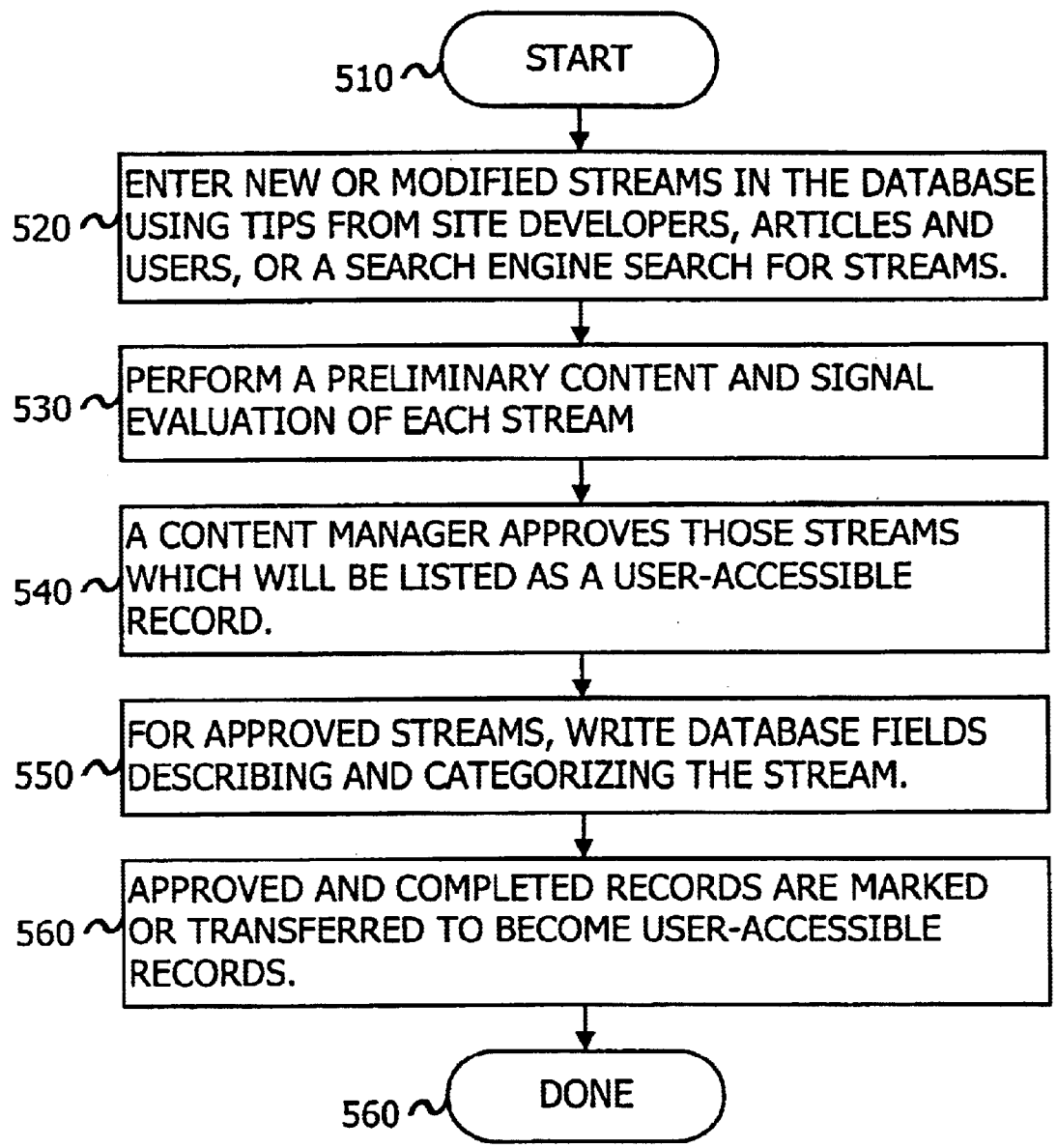
FIG. 5 shows the method used for filling out records in the Stream Database.

FIG. 5 shows the method used to prepare and update the relatively static fields of the stream table portions of the database system 123. The method starts at a step 510. In step 510, the various media streams are identified and new records are created in the stream database 145 under the direction of the database management system 142. Media streams are located based on information provided by site developers, publications, system users, or from the results of search engines. Hereafter, references to a "manager" or "editor" refer both to people performing the tasks or the use of computer assistance or software that may automatically perform at least portions of the task. In a step 530, an evaluation manager performs preliminary content and signal evaluations of each stream. In a step 540, a content manager approves and specifies those streams that will be entered as a user-accessible record in the stream database 145. The content manager duties may include saving the Web page URLs to be used in writing portions of the stream description and extracting the URLs of media streams from Web pages being screened, and entering both types of URLs into the stream database 145. In a step 550, a database editor, who may be the same person as the content manager, writes database fields that describe and categorize each user-accessible stream based on materials collected previous steps. In a step 560, stream records which were approved for inclusion in the user-accessible records and have all field completed are made available to stream database 145 users by setting a record status flag to "user-accessible."

Figure 6:
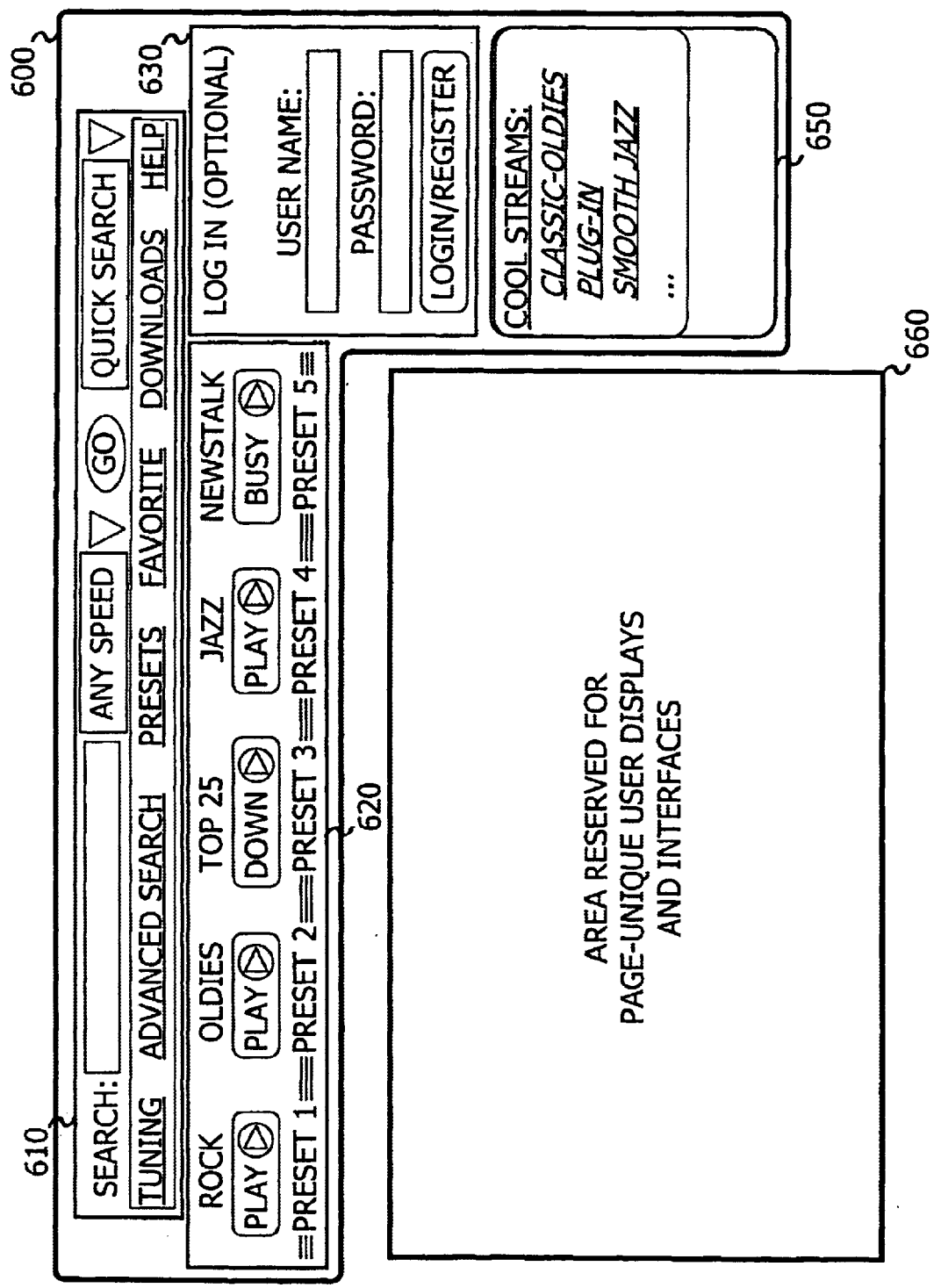
FIG. 6 is an illustration of a representative Web page tool bar that interacts with the USTS database.

Since there are other USTS-enabled services 130 that may use the USTS 120, the USTS 120 design makes it easy to customize the interactive displays obtained from the database system 123 so that a variety of different user display types are produced. To illustrate how the different aspects of the invention may be displayed to users, a representative Web page is shown in FIG. 6.

A Web page might include a tool bar set 600 and a user interactive display 660. The tool bar set 600 could include a search and access tool group 610 that contains interactive buttons and input fields to guide stream searches or to access other USTS Web pages. Stream search options may include beginner or advanced searching capabilities. Across the bottom of search and access tool 610 are a number of hot-links that directly access other useful Web pages, such as A tuning Web page showing a number of major categories and subcategories of media content (See FIG. 7);

An advanced search display, which allows users to conduct advanced custom stream searches;

A presets Web page, which allows users to directly set known stream URLs as one of the stream presets;

A favorite Web page, which allows users to list many preferred streams which are too numerous to include as one of the fixed number of presets;

A downloads Web page, which allows users to download stream-related plug-ins, such as media players; and A help Web page, which provides conventional help to USTS 120 users.

A presets tool group 620 selects and plays a stream that the user has previously selected on one or more of the other Web pages.

A log-in Dialog 630 allows users to register with the service so they may later access all of their user preferences, presets and favorite streams.

A "cool streams" display 650 contains a plurality of stream links which the Web site editors believe would interest either a broad range of users or users with a particular profile. Each item in the cool streams display 650 contains a direct hot-link to that media stream. The Web site staff can periodically rotate the contents of the cool streams display for variety and to reflect popular trends.

Figure 7:
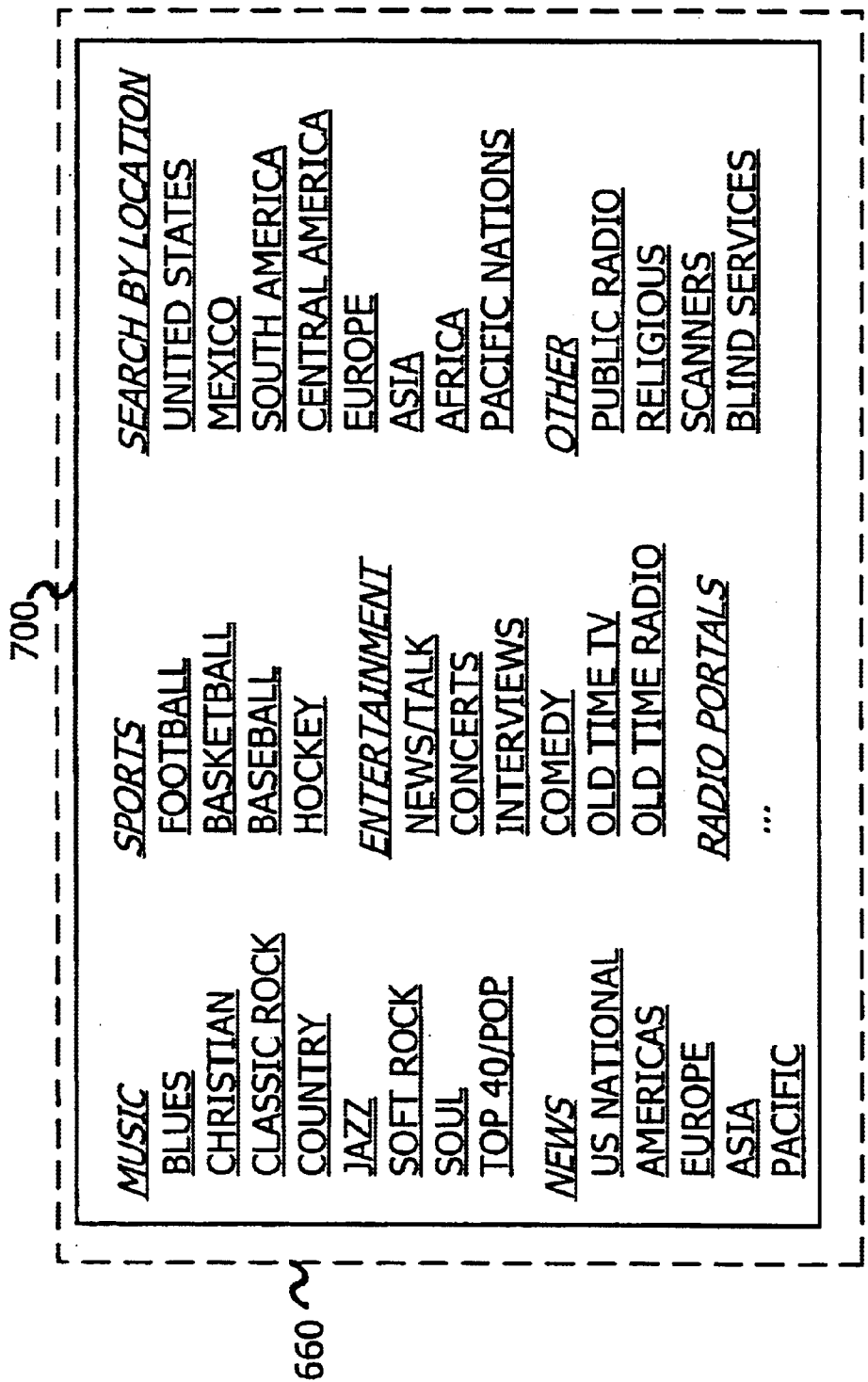
FIG. 7 is an illustration of a representative interactive display of stream categories and subcategories produced from the Stream Database.

The user interactive display 660 is frequently shown simultaneously with the tool bar and can contain varied contents such as advertisements, news, directories, search results of station details. The User Interactive Display 660 is reserved for the user interactive displays unique to each different Web page. FIGS. 7 through 9 show a series of different examples of user interface display contents.

FIG. 7 shows a directory that indicates the major categories and subcategories that are commonly used to classify streams. Selection of one such subcategory conducts a search filtered by the user profiles, and a corresponding interactive display of results is presented.

FIG. 8 shows the results of a simple keyword search resulting from the use of search fields in tool bar 600. Use of a category selector 720 may also produce a similar display.

A search status box 820 shows the number of matches to the user's search criteria. If the display is the result of selecting a choice from the category selector 720, then the search status box 820 can also display the total number of streams in this subcategory and provide a simple navigation interface that allows the user to return to a higher category in the hierarchy. A sort options Bar 830 might allow the user to re-sort the match results in order of signal strength, city, stream name, popularity or format. All of the matches are shown in a results box 840.

The top line of the results boxes 840 and 850 shows the stream name, the city of origin, the stream subcategory, and a Web site link. The second line, and possibly additional lines, in the results boxes 840 and 850 show:

The stream score indicated graphically;

The bit rate and type of media stream;

Buttons or other selection devices for choosing that stream as one of the preset streams (using a numbered button) or to a favorite (using the + button); and A button or other interactive device displaying the stream status (play, busy, or down) and enabling the user to play that stream, if it is in play status.

The last section of results display 840 and 850 contains a brief description of the stream. A "More Info" interactive device, such as a hot-link or button, allows the user to access a more complete listing of this stream, such as is shown in FIG. 9.

FIG. 9 illustrates a user interactive display 660 that contains more detailed information on a particular stream. Displays 910 and 920 have the same contents as the second line of the results boxes 840 and 850. A stream detail table 930 provides in-depth information on the stream.

Although the invention has been described in its presently contemplated best mode, it is clear that it is susceptible to numerous modifications, modes of operation and embodiments, all within the ability and skill of those familiar with the art and without the exercise of further inventive activity. Accordingly, that which is intended to be protected by Letters Patents is set forth in the claims and includes all variations and modifications that fall within the spirit and scope of the invention.

We claim:

1. An automated method for periodically evaluating media streams on a network of computers, comprising:

periodically obtaining a first group of addresses by use of a universal stream tuning service, each of said addresses identifying a location of a media stream on said network;

periodically obtaining a second group of addresses by use of said universal stream tuning service, each address in said second group identifying a location of a media stream on the network that was previously identified as being unavailable;

attempting to establish communication with each of said media streams in order to determine characteristics of said media stream;

terminating said communication with each media stream after characteristics have been determined if said connection to said media stream is established; and reporting the availability of each said media stream, and any determined characteristics of said stream.

2. The method of claim 1 wherein said second group of addresses is obtained more frequently than said first group of addresses.

3. The method of claim 2 wherein said characteristics of said stream comprise a transmission rate, a type of decoding required to convert each media stream into audio or video signals, and the number of audio channels said stream uses.

4. An automated method for evaluating media streams on a network of computers, comprising:

obtaining an address that identifies a location of a media stream on said network by use of a universal stream tuning service;

attempting to establish a connection with said media stream by using said address;

determining a transmission rate at which said media stream is being received if a connection to said media stream was established; and updating records that contain information about said media stream with information concerning whether a connection was made to said media stream and, if a connection was made, reporting said transmission rate.

5. The method of claim 4 further comprising:

determining the type of decoding scheme required to convert each of said media streams into audio signals or video signals if a connection to said media stream was established; and reporting a type of decoding scheme each media stream requires if a connection to said media stream was made.

6. The method of claim 5 further comprising rating each media stream based on both a transmission rate and type of decoding scheme required.

7. The method of claim 5 further comprising the step of rating each media stream based on said transmission rate, said type of decoding scheme required and a historical frequency of successful connections to said stream.

8. The method of claim 5 wherein said periodically obtaining addresses is accomplished by interpreting media stream meta-files.

9. The method of claim 5 further comprising:

assigning a unique identifier to several media streams that contain the same content;

identifying characteristics of a system through which a request for a unique identifier is made;

determining which of said several media streams is most appropriate for said system characteristics; and providing said system with said most appropriate address of said several media streams.

10. The method of claim 9 wherein said step of obtaining addresses is accomplished by providing said system with the most appropriate address.

11. A computer program for periodically evaluating media streams on a network of computers, comprising:
- a control loop that obtains a block of addresses from a universal stream tuning system database each time verification is required;
- at least one stream verification routine that receives an individual address from said control loop;
- a means for verifying that media streams associated with said addresses are capable of being accessed; and
- a means for delivering results of said stream verification to said database.

12. The computer program of claim 11 wherein portions of said database are made accessible to another system.

* * * * *

UNITED STATES PATENT AND TRADEMARK OFFICE
CERTIFICATE OF CORRECTION

PATENT NO. : 6,647,389 B1  Page 1 of 1
APPLICATION NO. : 09/651360
DATED : November 11, 2003
INVENTOR(S) : Jonathan M. Fitch et al.

It is certified that error appears in the above-identified patent and that said Letters Patent is hereby corrected as shown below:

On title page Item [54]
TITLE
Change "SEARCH ENGINE TO VERIFY STREAMING AUDIO SOURCES" to --AN AUTOMATED METHOD FOR PERIODICALLY EVALUATING MEDIA STREAMS--

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 6,647,389 B1  Page 1 of 1
APPLICATION NO. : 09/651360
DATED : November 11, 2003
INVENTOR(S) : Jonathan M. Fitch et al.

It is certified that error appears in the above-identified patent and that said Letters Patent is hereby corrected as shown below:

On title page Item [54] and Column 1 lines 1 and 2
TITLE
Change "SEARCH ENGINE TO VERIFY STREAMING AUDIO SOURCES" to
--AN AUTOMATED METHOD FOR PERIODICALLY EVALUATING MEDIA STREAMS--

This certificate supersedes the Certificate of Correction issued April 1, 2008.

Signed and Sealed this

Sixth Day of May, 2008

JON W. DUDAS
*Director of the United States Patent and Trademark Office*